United States Patent [19]

Gadessaud et al.

[11] 3,967,976
[45] July 6, 1976

[54] METHOD FOR PREPARING ELECTRODES FOR AN ELECTROCHEMICAL STORAGE CELL

[75] Inventors: Robert Gadessaud, Massy; Claudette Audry, Issy-les-Moulineaux, both of France

[73] Assignee: Compagnie Generale d'Electricite, Paris, France

[22] Filed: Mar. 24, 1975

[21] Appl. No.: 561,501

[30] Foreign Application Priority Data
Mar. 28, 1974 France ............................. 74.10902
Mar. 28, 1974 France ............................. 74.10903

[52] U.S. Cl. ............................. 136/75; 136/120 R
[51] Int. Cl.² ........................................ H01M 35/18
[58] Field of Search ............... 136/75, 19, 31, 120 R, 136/126, 125, 122, 64

[56] References Cited
UNITED STATES PATENTS
3,753,779   8/1973   Franko et al. ..................... 136/31

Primary Examiner—Anthony Skapars
Attorney, Agent, or Firm—Sughrue, Rothwell, Mion, Zinn & Macpeak

[57] ABSTRACT

In this invention, according to a first embodiment, the collector part of the electrode is formed by a full plate on which are deposited longitudinal strips of polytetrafluorethylene before the depositing of the electrochemically active part. In a second embodiment, the collector part is formed by a grid which is coated, before the depositing of the electrochemically active part, with a zinc oxide paste and polytetrafluorethylene In this way, one or more spaces are provided between the collector part and the electrochemically active part, the result thus being that the gases given off by the reactional process may escape easily by following the space(s), thus avoiding any deformation of the electrode.

30 Claims, 5 Drawing Figures

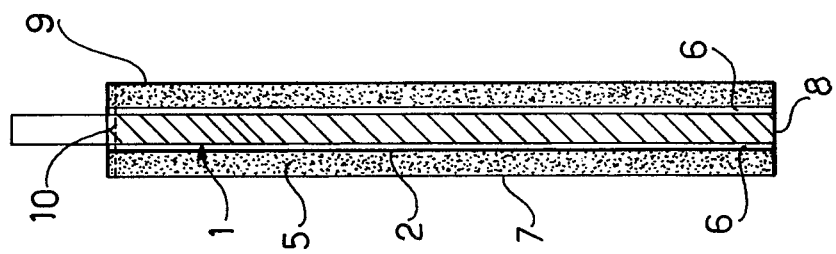
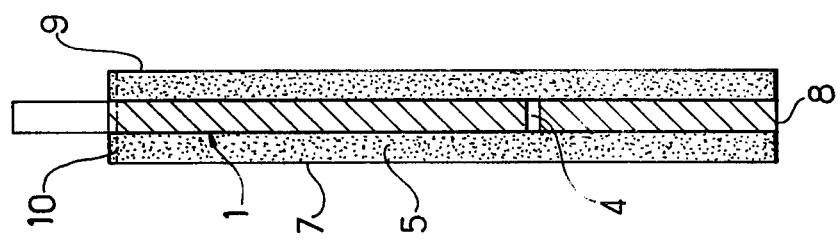
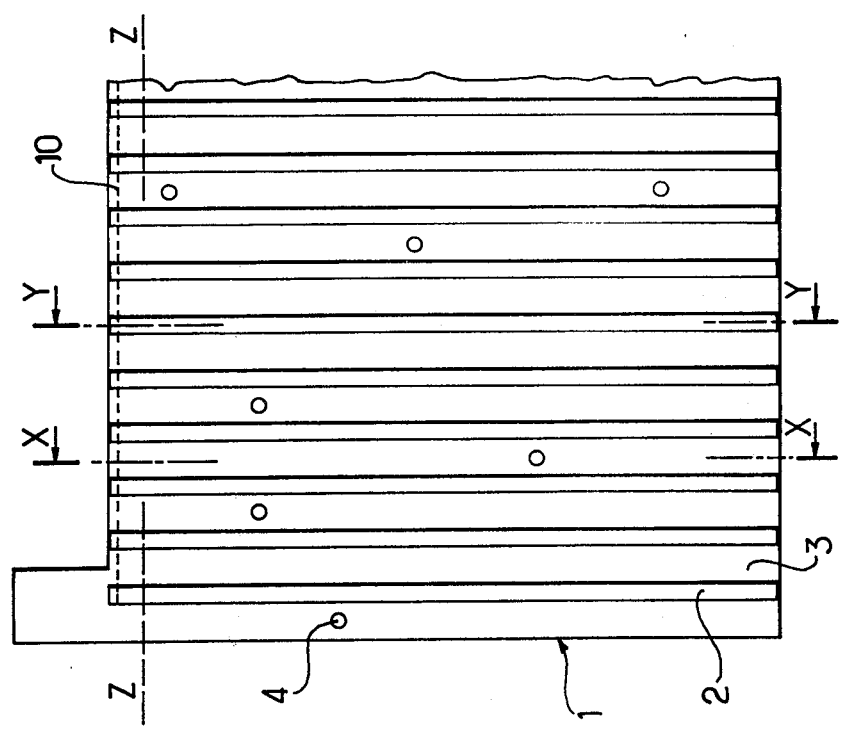

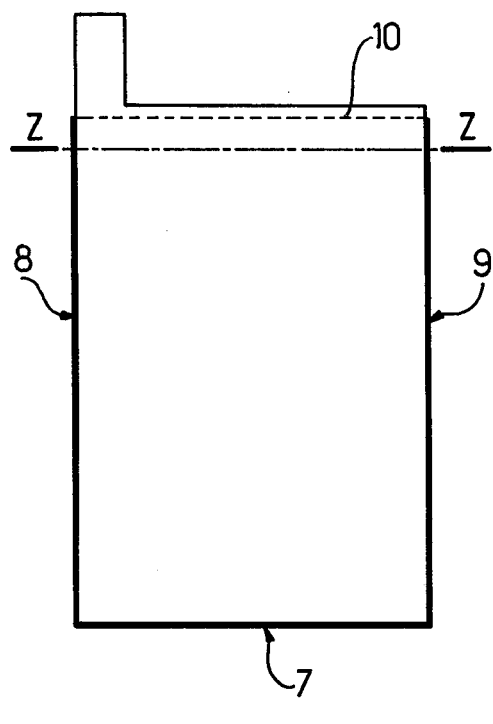
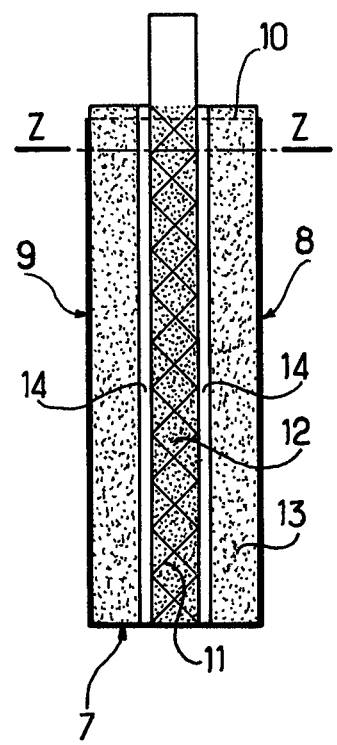

METHOD FOR PREPARING ELECTRODES FOR AN ELECTROCHEMICAL STORAGE CELL

BACKGROUND OF THE INVENTION

The present invention concerns a method for preparing electrodes for electrochemical storage cells, more particularly for the preparation of zinc electrodes.

The present invention has more particularly as its object a practical method for preparing electrodes and more particularly zinc electrodes, that method aiming at avoiding any diffusion of zincate ions and the dangers of short-circuits ensuing therefrom. Moreover, such electrodes enable the free evolution of gases and more particularly of hydrogen resulting from the electrochemical process, thus avoiding any swelling within it and the disadvantage resulting therefrom.

SUMMARY OF THE INVENTION

The invention therefore concerns a method for preparing electrodes for an electrochemical storage cell, these electrodes comprising a collector part constituted by an electronically conductive and chemically inert material coated an electrochemically active part comprising a metal or a compound of the metal, as well as a partly reticulated polymer, a method in which:

A. a substantially saturated solution of the polymer in water, to which is added an element supplying an aldehyde in a quantity sufficient for partly reticulating the polymer in contact with at least a catalyst, in a proportion of 5 to 20% by weight, is prepared;

B. a salt of the metal is added to the aqueous solution of the polymer in a proportion of 20 to 50 parts by weight for one part of polymer, the salt being, on the one hand, soluble in water and, on the other hand, compatible with the polymer, such an addition being effected at a temperature between 50° and 100° C;

C. the solution thus prepared is run into a mould in which the collector part of the electrode has previously been placed, until a complete immersion of the latter occurs;

D. the mould is cooled a temperature at the most equal −20° C;

E. the cake constituted in the mould is stripped and it is immersed in an alkaline solution saturated with an oxide of the metal;

F. the cake is washed in cold water;

G. the cake is dried at a temperature between 20° and 60° C;

H. the cake is compressed at a pressure between 2 and 10 bars/sq. cm.; the method being characterized in that longitudinal strips of a material having, with respect to the electrochemically active part of the electrode, non-adhesive properties, so that a space thus remains between the electrochemically active part and each of the strips, are deposited on each of the faces of the collector part.

The invention also concerns a method for preparing electrodes for an electrochemical storage cell, these electrodes comprising a collector part constituted by an electronically conductive and chemically inert material coated on an electrochemically active part comprising a metal or a compound of the metal, as well as a partly reticulated polymer, a method in which:

A. a substantially saturated solution of the polymer in water, to which is added an element suitable for partly reticulating the polymer in contact with at least a catalyst, in a proportion of 5 to 20% by weight, is prepared;

B. a salt of the metal is added to the aqueous solution of the polymer in a proportion of 20 to 50 parts by weight for one part of polymer, the salt being, on the one hand, soluble in water and, on the other hand, compatible with the polymer, such an addition being effected at a temperature between 50° and 100° C;

C. this solution prepared above is run into a mould in which the collector part of the electrode has previously been placed, until a complete immersion of the latter occurs;

D. the mould is cooled to a temperature at the most equal to −20° C;

E. the cake formed in the mould is stripped and it is immersed in an alkaline solution saturated with an oxide of the metal;

F. the cake is washed in cold water;

G. the cake is dried at a temperature between 20° and 60° C;

H. the cake is compressed at a pressure between 2 and 10 bars/sq. cm.; this method being characterized in that the collector part is previously coated with a material having, with respect to the electrochemically active part of the electrode, non-adhesive properties, so that a space thus remains between the electrochemically active part and the collector part.

BRIEF DESCRIPTION OF THE DRAWINGS

The following part of the text will describe, with reference to the accompanying drawings, by way of an example of embodiment which is purely illustrative but has no limiting character, an embodiment of a method of producing a zinc electrode according to the invention, intended to be used in a storage cell whose electrolyte is an aqueous potassium hydroxide solution.

FIG. 1 shows an elevation view of a first embodiment of an electrode according to the method of the invention;

FIG. 2 is a side view of a cross-section through the line XX in FIG. 1;

FIG. 3 is a side view of a cross-section through the line YY in FIG. 1;

FIG. 4 shows an elevation view of a second embodiment of an electrode according to the method of the invention;

FIG. 5 is a side view of a cross-section of FIG. 4.

DETAILED DESCRIPTION OF THE INVENTION

According to FIG. 1, the electrode comprises, in a first embodiment, a part or collector web 1 formed by a thin sheet of silver-plated nickel or of another suitable conductive material.

Thin longitudinal strips 2 of a water-repellent material such as polytetrafluorethylene (PTFE) or polydichlorodifluoroethylene have been arranged on each of the faces of that sheet, the width of such strips being in the order of one-half or one-eighth of the width of the residual metallic surfaces 3. Openings or drillings such as 4 are provided right through the residual surfaces 3, such openings being intended to ensure effective fixing of the electrochemically active part deposited subsequently.

The producing of such longitudinal strips is effected as follows:

An even layer of PTFE is deposited on each face of the sheet 1 by spraying by means of a pneumatic spray gun. This layer is sintered at about 320° to 380° C so as to obtain good adherence. Then, by means of a suitable tool having teeth whose width is equal to the width of the metallic surfaces 3 and whose spacing is equal to the width of the strips 2 of PTFE, the layer thus deposited is scraped off, so as to remove the PTFE only from the metallic surfaces 3, on each of the faces of the sheet 1.

One variation comprises depositing the layer of PTFE by immersion of the sheet 1 in a PTFE emulsion such as "Soreflon", then in sintering and producing the strips 2 as described herebelow.

Another variation comprises providing, on the surfaces of the sheet 1, masks corresponding to the dimensions of the metallic surfaces 3 and in spraying a PTFE aerosol. The masks are then removed so as to leave the metallic surfaces 3 clear, then the PTFE is sintered. Of course, polydichlorodifluoroethylene may be used instead of PTFE.

The collector web 1 therefore has the shape shown in FIG. 1.

According to FIGS. 4 and 5, the electrode comprises, in a second embodiment, a part or collector web 11 formed by a silver-coated nickel grating or a grating made of any other suitable conductive material.

A paste 12 is spread on that grating 11 so that the openings in the grating 11 are stopped up.

Then, the excess paste is removed by any suitable means from the surface of the grating, leaving only a thin film on the grating 11. This is then dried to remove the diluting agent of the paste.

The composition of that paste may, by way of an example, have the following formula:

| | |
|---|---|
| Zinc oxide: | 100 gr. |
| Polytetrafluroethylene: | 2 gr. |

That mixture is diluted in a ethanol in quantity sufficient for obtaining a paste suitable for being spread as mentioned above.

To great advantage, 1 gr of mercuric acetate can be added to that mixture with a view to increasing the overpotential.

It will be observed, moreover, that polytetrafluorethylene may be replaced by another water-repellent compound such as polydichlorodifluoroethylene.

Then, 10 gr of polyvinyl alcohol, designated hereinafter by the abbreviation PVA, are inserted cold in about 200 cc of water.

The mixture is heated almost up to the boiling point until complete dissolution.

The following are mixed into the solution thus obtained:

1 gr of dimethylolurea;
0.5 gr of ammonium chloride and
0.3 gr of sodium sulphate.

Dimethylolurea in contact with $NH_4Cl$ and $Na_2SO_4$ partly reticulates PVA by the forming a polyvinyl acetal.

A zinc salt which is very soluble in water and compatible with the PVA (in this instance, zinc acetate $(CH_3CO_2)_2 Zn. 2H_2O$) in a proportion of about 340 gr, is then added to that solution, while shaking it, at a temperature of substantially 70°. To great advantage, 3 gr of mercuric acetate may also be mixed in, in order to increase the over-potential. In this way, a viscous liquid which is run into a mould, in which, according to the present invention, the collector web 1 such as shown in FIG. 1 or the grating illustrated in FIG. 5 has previously been inserted, is obtained with the running off being effected until the assembly is immersed within the liquid.

The mould is then cooled suddenly to about −20° C, so as to form zinc acetate crystals of very small size.

The cake thus obtained is then immersed in a potassium hyroxide solution having a concentration of 8 to 12 N saturated with zinc oxide ZnO, for substantially 24 hours. During that operation, the potassium hydroxide diffuses into the mass of the cake and transforms the zinc acetate into oxide while coprecipitating the PVA.

At the end of that treatment, the cake is thoroughly washed with water in order to draw away the residual potassium hydroxide, then dried in an oven at about 40° C; during such a drying operation, the assembly is held slightly clamped between two gratings with a view, on the one hand, to promoting the removal of the water and, on the other hand, to prevent any deformation or cracking by thermal stress.

The cake is compressed at a pressure of about 5 bars/sq. cm. so as to form the electrode.

A method for preparing a zinc electrode, using zinc acetate for that purpose, has been described hereinabove. Of course, the zinc acetate may be replaced by another salt, provided that this latter salt be very soluble in water and compatible with the PVA.

By way of an example having no limiting character, halides (more particularly zinc chloride), nitrate or chlorate may be used.

The same considerations apply in the case of the production of nickel and cadmium electrodes, the acetates of these metals possibly being, to great advantage, used for that purpose.

It will be observed that in all cases, the structure of the electrodes is in the form of very small metallic grains coated with a thin film of PVA which wets the grains completely and hence prevents their migration towards the lower part, while forming an obstacle for zincate ions.

On referring to FIGS. 2 and 3, the sheet 1 will be seen to be immersed in a mass 5 of zinc oxide and of PVA particles precipitated by the potassium hydroxide.

FIG. 2 shows that this mass adheres to the metallic parts 3 of the sheet 1 which are not covered with PTFE.

On the other hand, on referring to FIG. 3, it will be seen that subsequent to the mutual non-adhesive properties between the mass 5 and the strips 2 of PTFE, spaces 6 are thus provided between the strips and the mass 5.

On referring to FIG. 5, it will be seen that the grating 11 is surrounded with a mass 13 of zinc oxide and of PVA particles precipitated by the potassium hydroxide. It will be seen in this figure that subsequent to the mutual non-adhesive properties between the mass 13 and the material within the grating 11, a space is thus provided between the grating 11 and the mass 13, on either side of the grating.

Moreover, in both embodiments, the faces as well as the thick edges of the electrode are coated, preferably by painting, with a solution of reticulated PVA substantially similar to the solution used for forming the electrode itself. Thus, fluid-tight layers such as 7, 8 and 9 preventing any diffusion of zincate ions are formed.

After drying, the deposit is removed from the upper thick edge of the cell simply by cutting out the upper end along the line 10 materially illustrated by interrupted lines, with scissors.

Of course, during the use of the electrode, the latter is not completely immersed in the electrolyte. In the case illustrated by the figures, the level of the electrolyte is materially illustrated, substantially by the line ZZ.

The electrodes thus formed have improved mechanical and electrical characteristics, this imparting excellent operational characteristics to the electrochemical storage cells in which they are incorporated.

Such advantages result more particularly from the fact that the hydrogen evolved during the electrochemical process fills the spaces 6 or 14 and flow out freely into the atmosphere through the upper thick edge of the electrode cut out as previously mentioned, thus avoiding any swelling within the electrode.

It will be observed, moreover, that the existence of zinc oxide in the grating 11 as shown in FIG. 5 imparts to the latter improved conductivity, this resulting in a further increase in the performances of the storage cell in which the electrode is used.

It must be understood that the invention is in no way limited to the embodiments described and illustrated, which have been given only by way of examples.

More particularly, without going beyond the scope of the invention, details may be modified, certain compositions may be changed or certain means may be replaced by equivalent means.

What is claimed is:

1. A method for preparing an electrode for an electrochemical storage cell, the electrode comprising a collector part of an electronically conductive and chemically inert material coated on an electrochemically active part comprising an oxide of a metal, as well as a partly reticulated polymer, the method comprising:
   A. preparing a substantially saturated solution of said polymer in water, and adding an agent capable of forming an aldehyde in a quantity sufficient for partly reticulating said polymer in contact with at least a catalyst, in a proportion of 5 to 20% by weight of the agent capable of forming the aldehyde based on the weight of said polymer;
   B. adding a salt of said metal to the aqueous solution of said polymer in a proportion of 20 to 50 parts by weight for one part of said polymer, said salt being soluble in water and compatible with said polymer; the addition being at a temperature between 50° and 100°C;
   C. filling a mould in which said collector part of the electrode has previously been placed with said solution, until said collector part of the electrode is completely immersed;
   D. cooling the mould to a temperature of no lower than −20°C;
   E. removing the cake formed in D) from said mould and immersing said cake in an alkaline solution saturated with an oxide of said metal;
   F. washing said cake in cold water;
   G. drying said cake at a temperature between 20° and 60°C; and
   H. compressing said cake at a pressure between 2 and 10 bars/sq.cm., whereby longitudinal strips of a material having, with respect to said electrochemically active part of said electrode, non-adhesive properties are deposited on each of the faces of said collector part, so that a space thus remains between said electrochemically active part and each of the longitudinal strips.

2. The method according to claim 1, wherein the width of said strips is between one half and one-eighth of the width of the residual surfaces between the strips of the electronically conductive material of said collector part.

3. The method according to claim 1, including, successively:
   depositing a uniform layer of said material having, with respect to the electrochemically active part of the electrode, non-adhesive properties, on each of the faces of said collector part;
   sintering said layer; and
   removing portions of said material whereby, only said longitudinal strips remain on said faces.

4. The method according to claim 1, including:
   depositing masks spaced, in relation to one another, at a distance equal to the distance between said strips on each of the faces of said collector part;
   depositing an even layer of said material having, with respect to the electrochemically active part of the electrode, non-adhesive properties, on each of the faces of said collector part;
   removing said masks; and
   sintering the material forming said strips.

5. The method according to claim 3, wherein said material having, with respect to the said electrochemically active part of the electrode, non-adhesive properties, is polytetrafluoroethylene or polydichlorodifluoroethylene.

6. The method according to claim 1, including forming openings in at least one of the residual surfaces between said longitudinal strips.

7. A method for preparing an electrode for an electrochemical storage cell, the electrode comprising a collector part of an electronically conductive and chemically inert material coated on an electrochemically active part comprising an oxide of a metal, as well as a partly reticulated polymer, the method comprising:
   A. preparing a substantially saturated solution of said polymer in water, and adding an agent capable of partly reticulating said polymer in contact with at least a catalyst, in a proportion of 5 to 20% by weight of the agent capable of partly reticulating said polymer based on the weight of said polymer;
   B. adding a salt of said metal to the aqueous solution of said polymer in a proportion of 20 to 50 parts by weight for one part of said polymer, said salt being soluble in water and compatible with the polymer, the addition being at a temperature between 50° and 100°C;
   C. filling a mould in which said collector part of the electrode has previously been placed with said solution, until said collector part of the electrode is completely immersed;
   D. cooling the mould to a temperature of no lower than −20°C;
   E. removing the cake formed in D) from said mould and immersing said cake in an alkaline solution saturated with an oxide of said metal;
   F. washing said cake in cold water;
   G. drying said cake at a temperature between 20° and 60°C; and
   H. compressing said cake at a pressure between 2 and 10 bars/sq.cm., whereby said collector part is previously coated with a material having, with respect to said electrochemically active part of the electrode, non-adhesive properties, so that a space thus remains between said electrochemically active part and said collector.

8. The method according to claim 7, wherein said material having, with respect to said electrochemically active part of the electrode, non-adhesive properties, comprises zinc oxide as well as 1 to 10% by weight of a water-repellent compound.

9. The method according to claim 8, wherein said water-repellent compound is polytetrafluoroethylene.

10. The method according to claim 8, wherein said water-repellent compound is polydichlorodifluoroethylene.

11. The method according to claim 7, wherein said material having, with respect to the electrochemically active part, non-adhesive properties, is applied to said collector part in the form of a paste obtained by dilution in ethanol.

12. The method according to claim 7, including adding substantially 1% by weight of mercuric acetate to said material having, with respect to the electrochemically active part, non-adhesive properties.

13. The method according to claim 1, wherein the electrode resulting from the compressing of the said cake is coated with the partly reticulated polymer solution prepared in A), such coating being performed on the whole of the lateral faces of and of the thick edges of the electrode.

14. The method according to claim 1, wherein the upper thick edge of the electrode is cut parallel to its ridge.

15. The method according to claim 1, wherein the metal of said electrochemically active part is zinc, cadmium or nickel.

16. The method according to claim 15, wherein the salt of the metal of said electrochemically active part is a halide, an acetate, a nitrate, or a chlorate.

17. The method according to claim 1, wherein said polymer is polyvinyl alcohol.

18. The method according to claim 17, wherein said agent capable of partly reticulating the polymer is dimethylolurea.

19. The method according to claim 1, including adding mercuric acetate to the solution, in B) in a proportion of 1 to 3% by weight based on the weight of the metal constituting the electrochemically active part of the electrode.

20. An electrode produced by the method according to claim 1.

21. An electrochemical storage cell comprising at least one electrode according to claim 21.

22. The method according to claim 7, wherein the electrode resulting from the compressing of the said cake is coated with the partly reticulated polymer solution prepared in A) such coating being performed on the whole of the lateral faces of and of the thick edges of the electrode.

23. The method according to claim 7, wherein the upper thick edge of the electrode is cut parallel to its ridge.

24. The method according to claim 7, wherein the metal of said electrochemically active part is zinc, cadmium or nickel.

25. The method according to claim 24, wherein the salt of the metal of said electrochemically active part is a halide, an acetate, a nitrate, or a chlorate.

26. The method according to claim 1, wherein said polymer is polyvinyl alcohol.

27. The method according to claim 26, wherein said agent capable of partly reticulating the polymer is dimethylolurea.

28. The method according to claim 7, including adding mercuric acetate to the solution, in B) in a proportion of 1 to 3% by weight based on the weight of the metal constituting the electrochemically active part of the electrode.

29. An electrode produced by the method according to claim 7.

30. An electrochemical storage cell comprising at least one electrode according to claim 29.

* * * * *